US006711465B2

(12) United States Patent
Tomassi

(10) Patent No.: US 6,711,465 B2
(45) Date of Patent: Mar. 23, 2004

(54) VENDING MACHINE HAVING A BIOMETRIC VERIFICATION SYSTEM FOR AUTHORIZING THE SALES OF REGULATED PRODUCTS

(76) Inventor: Robert Tomassi, 84 Quarry Rd., Levittown, PA (US) 19057

( * ) Notice: Subject to any disclaimer, the term of this patent is extended or adjusted under 35 U.S.C. 154(b) by 0 days.

(21) Appl. No.: 10/038,445

(22) Filed: Jan. 7, 2002

(65) Prior Publication Data

US 2003/0130762 A1 Jul. 10, 2003

(51) Int. Cl.[7] .................................... G06F 17/00
(52) U.S. Cl. .................................... 700/236; 700/237
(58) Field of Search .................................... 700/236, 237, 700/241, 244; 235/379, 380, 381, 382

(56) References Cited

U.S. PATENT DOCUMENTS 5,088,586 A * 2/1992 Isobe et al. ................. 700/236
5,377,864 A * 1/1995 Blechl et al. .................. 221/2
5,722,526 A * 3/1998 Sharrard ..................... 235/381
6,119,932 A * 9/2000 Maloney et al. ............ 235/380
6,148,091 A * 11/2000 DiMaria ..................... 382/115
6,308,887 B1 * 10/2001 Korman et al. ............. 235/379
6,363,299 B1 * 3/2002 Hartsell, Jr. ................ 700/237
6,523,741 B1 * 2/2003 DiMaria et al. ............ 235/375
6,560,741 B1 * 5/2003 Gerety et al. ............... 235/437

* cited by examiner

*Primary Examiner*—Gene O Crawford
(74) *Attorney, Agent, or Firm*—LaMorte & Associates

(57) ABSTRACT

A vending machine system and its associated method of operation. In the vending machine system, customers are provided with identification cards having statistical information regarding the age of the card owner. Also contained on the card is data corresponding to a biometric characteristic of the card owner. Vending machines are provided that contain card readers and biometric characteristic verifiers. When a customer wants to use the vending machine, that customer inserts their identification card into the vending machine. That customer also subjects themselves to a biometric scan from the biometric characteristic verifier contained within the vending machine. The vending machine reads both the statistical age information from the identification card and the biometric characteristic data. A systems processor in the vending machine compares the biometric characteristic data on the identification card with the biometric characteristic data just gathered.

7 Claims, 3 Drawing Sheets

VENDING MACHINE HAVING A BIOMETRIC VERIFICATION SYSTEM FOR AUTHORIZING THE SALES OF REGULATED PRODUCTS

BACKGROUND OF THE INVENTION

1. Field of the Invention

The present invention relates to vending machines that sell products directly to the public. More particularly, the present invention relates to vending machines having identification verification capabilities to ensure that the person buying a product from the vending machine is legally allowed to make the purchase.

2. Description of the Prior Art

Vending machines are automated machines that provide a product or service to a customer upon the payment of a fee. There are many different types of vending machines in existence. These vending machines sell a nearly countless variety of products and services.

Vending machines are popular because of convenience. Vending machines are ready for business at all times of the day and night. Furthermore, vending machines can be placed in remote locations, such as train stations, hotel corridors and the like that are convenient to customers. However, most all vending machines are non-discriminating. That is, the vending machines will sell a product or service to anyone who deposits the required fee into the vending machine. This is fine with vending machines that sell unregulated products such as candy or soda. However, laws are broken when the vending machine sells regulated products, such as cigarettes, to people who are not legally allowed to purchase such products.

Many municipalities, including New York City, have passed laws banning vending machines that sell regulated products, such as cigarettes. Such municipalities hope that by banning such vending machines, the potential of abuse of these vending machines will be eliminated. However, by banning such vending machines, such municipalities have removed a convenience to customers, the vast majority of which are legally allowed to purchase the products being sold.

In the prior art, there have been attempts to change the design of vending machines so that the vending machines can only sell products to authorized customers. Such prior art vending machines are exemplified by U.S. Pat. No. 5,722,526 to Sharrard, entitled, Dispensing Security System For A Vending Machine. In the Sharrard patent, a vending machine is disclosed that validates the identity of a consumer through an identification card. The identification card is inserted into the vending machine. If the identification card indicates that the customer is of legal age, the vending machine will vend the regulated product.

Such vending machines have not become successful because of the obvious flaw in the verification system. Any person having a valid identification card can use the vending machine. Accordingly, an underage person can purchase regulated products from a vending machine just by borrowing someone else's card. Since the vending machines verify the card and not the person using the card, the degree of verification is insufficient to overcome the reasons for the ban of vending machines that sell regulated products.

A need therefore exists for a vending machine that directly verifies the person using the vending machine in a manner that cannot be falsified. This would enable vending machines to vend regulated products directly to customers without the fear of abuse by underage or other unauthorized users. This need is met by the present invention as described and claimed below.

SUMMARY OF THE INVENTION

The present invention is a vending machine system and its associated method of operation. In the vending machine system, customers are provided with identification cards. The identification cards can be driver's licenses, bankcards or a specialty vending card. On the identification card is statistical information regarding the age of the card owner. Also contained on the card is data corresponding to a biometric characteristic of the card owner.

Vending machines are provided that contain card readers and biometric characteristic verifiers. When a customer wants to use the vending machine, that customer inserts their identification card into the vending machine. That customer also subjects themselves to a biometric scan from the biometric characteristic verifier contained within the vending machine.

The vending machine reads both the statistical age information from the identification card and the biometric characteristic data. A systems processor in the vending machine compares the biometric characteristic data on the identification card with the biometric characteristic data just gathered by the biometric scan of the customer. If the data matches, it can be assumed that the owner of the identification card is using the identification card. If the identification card then indicates that the customer is old enough to purchase a regulated product, the vending machine is enabled and a regulated product can be sold from the vending machine.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

Although the present invention can be added to any known form of a vending machine, the present invention is especially well suited for a vending machine that is configured to sell cigarettes or alcoholic beverages. In the embodiment first shown, the present invention is shown as part of a cigarette vending machine. Such an embodiment is merely exemplary and it should be understood that the present invention can be embodied in many other forms, depending upon the shape, size and configuration of the regulated product being sold.

Figure 1:
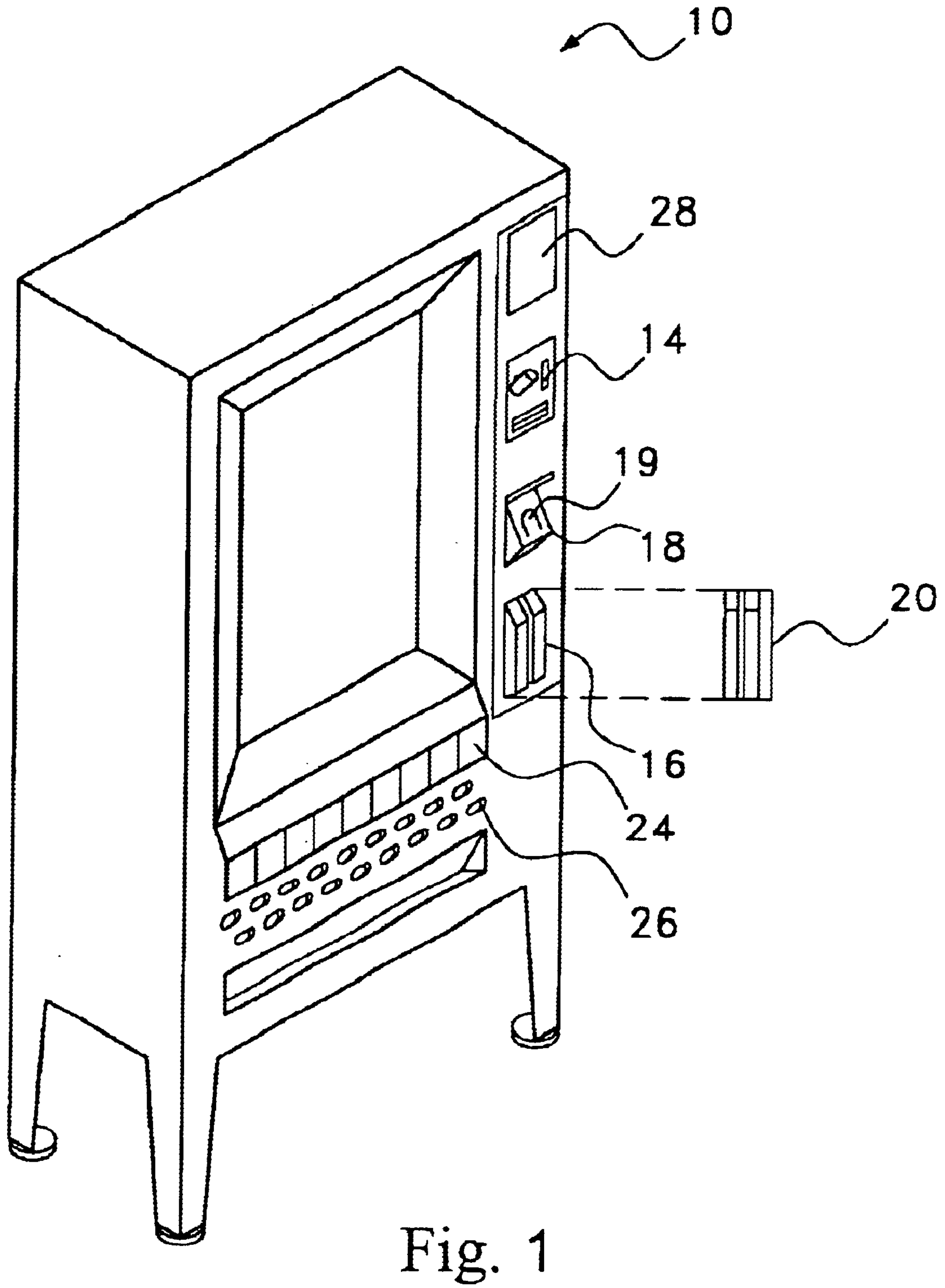
FIG. 1 is a perspective view of an exemplary embodiment of a vending machine in accordance with the present invention.

Referring to FIG. 1, a vending machine 10 is shown that vends a product subject to legal regulations. In the shown embodiment, the vending machine 10 is a cigarette machine. In most places, it is illegal to sell cigarettes to any person under the age of eighteen. However, it should be understood that the vending machine can be a machine that sells alcoholic beverages or a machine that distributes prescription medications. The sale of alcoholic beverages and pharmaceuticals is also subject to state and federal regulations.

The vending machine 10 contains a customer interface 12 that contains three separate components. The first component is a money validation unit 14. The money validation unit 14 can be a coin slot and/or paper money acceptor that receives money and validates the value of the money submitted. Such money validation units are commonplace in most all existing vending machines.

The second component of the customer interface 12 is a card reader 16. The card reader 16 can either be a slot or a swipe path that is capable of reading data from the magnetic strip of an identification card 20. The identification card 20, as will later be explained is a card that contains both statistical identification parameters and at least one biometric identification parameter specific to the owner of the identification card 20.

The third component of the customer interface 12 is a biometric characteristic verifier 18. The biometric characteristic verifier 18 can be any device that reads a unique biometric parameter directly from the person using the vending machine. The biometric characteristic verifier 18 illustrated is a thumb print scanner. The thumbprint scanner has a pad 19 upon which a person places his/her thumb. Once a person places his/her thumb on the pad 19, the print on the thumb is electronically scanned. Although a thumbprint scanner is illustrated, it should be understood that other biometric characteristic verifiers can be used. Other biometric characteristic verifiers include, but are not limited to, retina scanners, face recognition systems, knuckle scanners, palm scanners, voice print recognition systems and the like. Many such biometric characteristic verifiers exist in the art of biometric identification. Any such biometric characteristic verifier can be adapted for use with the present invention.

A customer is instructed on how to use the vending machine 10 through instructions. The instructions may be printed on the vending machine 10. However, in a preferred embodiment, instructions are provided via an electronic display 28.

In addition to the customer interface 12, the vending machine 10 also includes a product selection display 24 and product selection controls 26. The product selection display 24 identifies the product selection controls 26. A customer uses the product selection controls 26 to select a product from the vending machine 10.

In FIG. 1, an identification card 20 is also shown. The identification card 20 contains two types of information. The first type of information is statistical information about a person, such as name, address, age and the like. The second type of information contained on the identification card 20 is at least one biometric parameter unique to the owner of the card. For instance, the identification card 20 can contain data that represents the thumbprint, retina scan, face recognition scan, or the like of the card owner.

The identification card 20 can be a custom card produced by a private company, such as a credit card company. However, states, such as the State of Pennsylvania, have announced that they will be adding biometric parameter data to driver's licenses in the future. Any such identification card distributed by the government can also be used.

Figure 2:
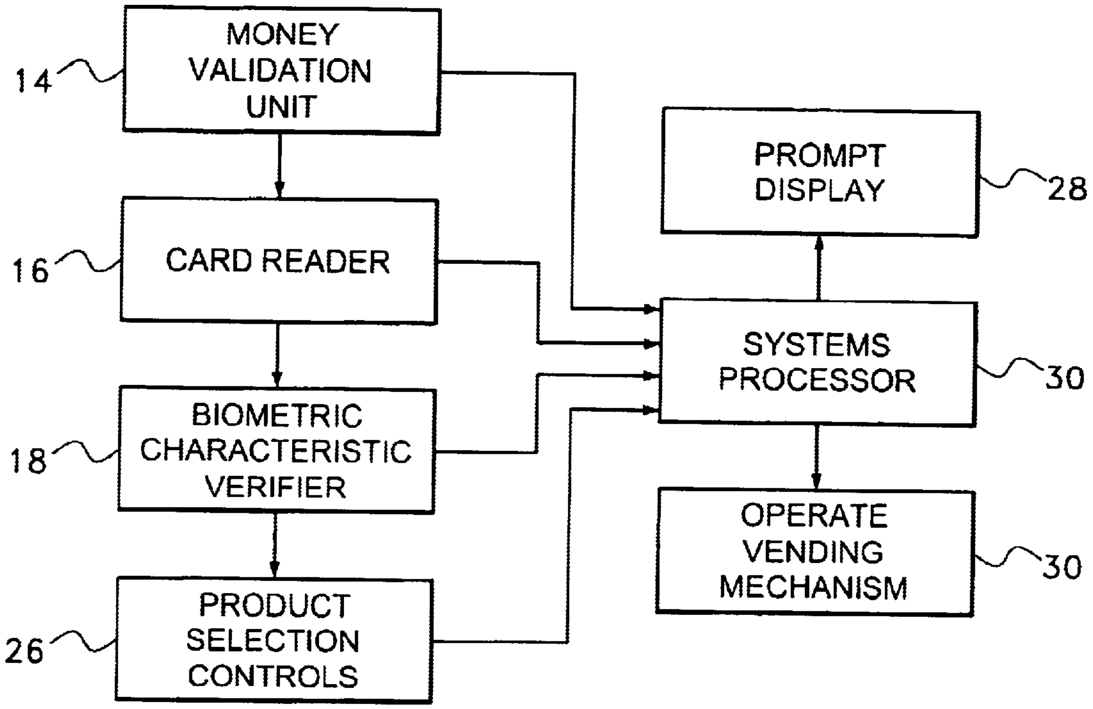
FIG. 2 is a schematic of the logic components of the vending machine.

Referring to FIG. 2, it can be seen that the money validation unit 14, the identification card reader 16, the biometric characteristic verifier 18 and the product selection controls 26 are all interconnected with a systems processor 30. The systems processor 30 is also connected to the various dispensing mechanisms 32 contained within the vending machine and the optional electronic display 28. Before the systems processor 30 activates any of the dispensing mechanisms 32, a proper sequence of events must occur that involves the money validation unit 14, card reader 16, biometric characteristic verifier 18 and product selection controls 26.

Figure 3:
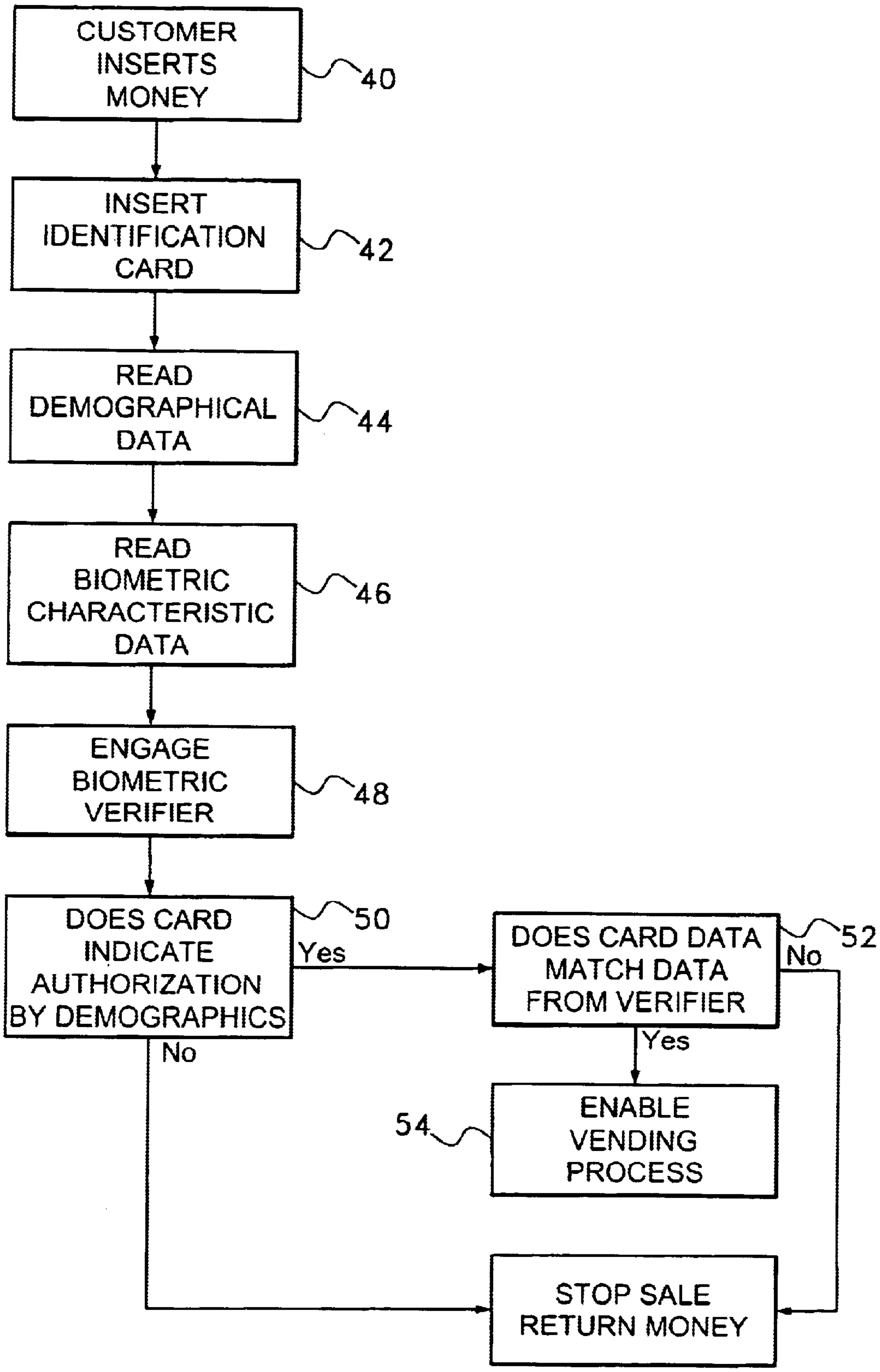
FIG. 3 is a block diagram logic flow illustrating an exemplary method of operation for the present invention.

Referring to FIG. 3, the method of operation for the vending machine system is disclosed. As is indicated by Block 40, a customer first inserts money into the money validation unit 14 (FIG. 1). The amount of money inserted must equal or surpass the price set for the regulated product that is to be sold.

Once the proper fee has been deposited, the customer is prompted to insert their identification card 20 (FIG. 1) into the identification card reader 16 (FIG. 1). This is indicated by Block 42. As shown by Block 44 and Block 46, respectively, the card reader reads the demographic data and the biometric data from the identification card. The demographic data can contain the age of the person as well as other information, such as name, customer number, driver's license number or the like that can be used to identify that person. The biometric data can be any set of data representative of a biometric characteristic. As has been previously mentioned, this can be a thumbprint, voice print, retina scan, face recognition scan or any other unique biometric parameter.

Once the statistical and biometric data is read from the identification card, the person using the vending machine is then prompted to engage the biometric characteristic verifier 18 (FIG. 1) on the vending machine. This step is shown by Block 48. This may include placing a thumb on a thumb pad, standing still for a face recognition scan or some similar process.

As is indicated by Block 50, the systems processor 30 (FIG. 2) within the vending machine first reads the statistical data gathered from the identification card. If the demographic data indicates that the person is underage or otherwise not authorized for the purchase, the vending machine does not permit the sale and the money is returned.

However, as indicated by Block 52, if the demographic data contained on the identification card does indicate that the sale is permissible, the systems processor then reads the biometric data from the identification card and compares that data to the data collected directly from the biometric characteristic verifier. If the biometric data contained on the identification card matches the data collected directly from the biometric verifier, it is safe to assume that the person who possesses the identification card is the authorized owner of that identification card. As such, the vending machine vends the selected product. See Block 54. However, if the biometric data contained on the identification card does not match the data collected directly from the biometric verifier, it can be assumed that an unauthorized person has possession of another's identification card. The vending machine will then refuse to sell the regulated product.

The present invention vending machine ensures that only authorized persons can purchase products from the vending machine. As such, tobacco products, alcoholic beverages and pharmaceutical products can be sold through vending machines without the fear of use from underage or otherwise unauthorized persons.

It will be understood that the embodiment of the present invention vending machine illustrated is only exemplary. There are hundreds of different makes and models of vending machines. The present invention verification system can be adapted for use in any such vending machine. All such modifications are intended to be included within the scope of the present invention as defined by the appended claims.

What is claimed is:

1. A method of permitting only authorized users to use an automated vending machine, comprising the steps of:

providing each of the authorized users with an identification card that contains age data and fingerprint data of the authorized user;

providing a vending machine having an identification card reading device and a finger print scanner, wherein said vending machine vends an age restricted product selected from a group consisting of cigarettes and alcoholic beverages;

reading said age data and said fingerprint data from an identification card inserted into said identification card reading device in said vending machine by a potential user;

scanning an actual fingerprint from the potential user using finger print scanner;

comparing scanned actual fingerprint of the potential user to said fingerprint data contained on said identification card;

enabling the vending machine if said scanned actual fingerprint of the potential user matches said fingerprint data contained on said identification card and if said age data contained on said identification card indicates that the potential user is older than some predetermined minimum age.

2. The method according to claim 1, further including the step of providing the vending machine with a money validation system for receiving and validating money from the potential user.

3. The method according to claim 2, further including the step of enabling the vending machine only after the potential user has deposited a predetermined fee into said money validation system.

4. A method of permitting only authorized users to use an automated vending machine that vends an age restricted product, comprising the steps of:

providing each of the authorized users with an identification card that contains age data and hand data of the authorized user;

providing a vending machine that vends an age restricted product selected from a group consisting of cigarettes and alcoholic beverages, wherein said vending machines has an identification card reading device and a hand scanner;

reading said age data and said hand data from an identification card inserted into said identification card reading device in said vending machine by a potential user;

scanning an actual hand characteristic from the potential user using said hand scanner;

comparing the scanned hand characteristic of the potential user to said hand data contained on said identification card;

enabling the vending machine if said scanned hand characteristic of the potential user matches said hand data contained on said identification card and if said age data contained on said identification card indicates that the potential user is older than some predetermined minimum age.

5. The method according to claim 4, wherein said hand scanner is selected from a group consisting of palm scanners, fingerprint scanners and knuckle scanners.

6. A method of permitting only authorized users to use an automated vending machine that vends an age restricted product, comprising the steps of:

providing each of the authorized users with an identification card that contains age data and retina data of that authorized user;

providing a vending machine that vends an age restricted product selected from a group consisting of cigarettes and alcoholic beverages, wherein said vending machine has an identification card reading device and a retina scanner;

reading said age data and said retina data from an identification card inserted into said identification card reading device in said vending machine by a potential user;

scanning an actual retina from the potential user, using said retina scanner;

comparing the scanned actual retina of the potential user to said retina data contained on said identification card;

enabling the vending machine if said scanned actual retina of the potential user matches said retina data contained on said identification card and if said age data contained on said identification card indicates that the potential user is older than some predetermined minimum age.

7. A method of permitting only authorized users to use an automated vending machine that vends an age restricted product, comprising the steps of:

providing each of the authorized users with an identification card that contains age data and voice pattern data of that authorized user;

providing a vending machine that vends an age restricted product selected from a group consisting of cigarettes and alcoholic beverages, wherein said vending machine has an identification card reading device and a voice pattern scanner;

reading said age data and said voice pattern data from an identification card inserted into said identification card reading device in said vending machine by a potential user;

scanning an actual voice pattern from the potential user, using said voice pattern scanner;

comparing the scanned actual voice pattern of the potential user to said voice pattern data contained on said identification card;

enabling the vending machine if said scanned actual voice pattern of the potential user matches said voice pattern data contained on said identification card and if said age data contained on said identification card indicates that the potential user is older than some predetermined minimum age.

* * * * *